Figures 1, 2:
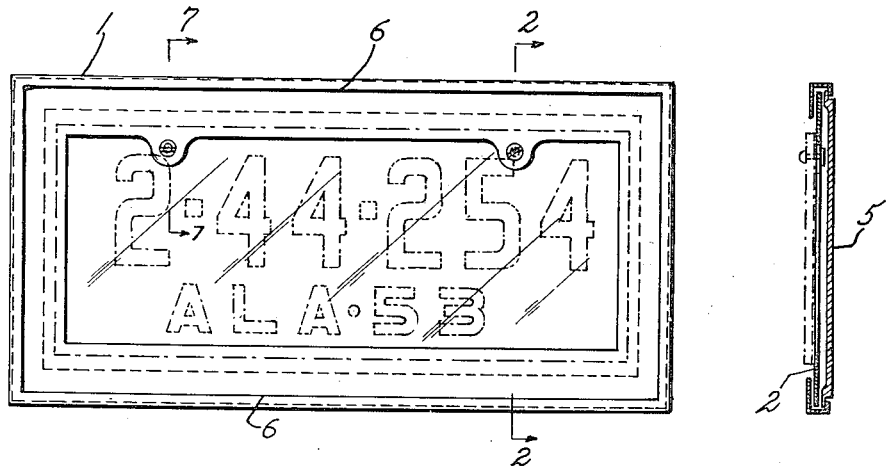

Aug. 14, 1956

L. C. SHUFF 2,758,400

AUTOMOBILE LICENSE NUMBER SAFETY FRAME

Filed April 2, 1953

INVENTOR.
Leonard C. Shuff
BY Chas. Leneegre
Attorney.

United States Patent Office 2,758,400
Patented Aug. 14, 1956

2,758,400

AUTOMOBILE LICENSE NUMBER SAFETY FRAME

Leonard C. Shuff, Birmingham, Ala.

Application April 2, 1953, Serial No. 346,382

2 Claims. (Cl. 40—125)

This invention relates to an automobile license number safety frame. It has for its main objects to provide such a frame that will be highly satisfactory for the purpose intended, simple in structure, cheap to manufacture, easy to install for use, and extremely durable.

A further object is to provide such a frame that will easily show a red danger signal should the regular tail light fail to show.

A further object is to reduce the danger of one car colliding with the rear of another car having the present invention thereon.

Further objects and advantages will appear from the drawing and specification.

Figures 3, 4:
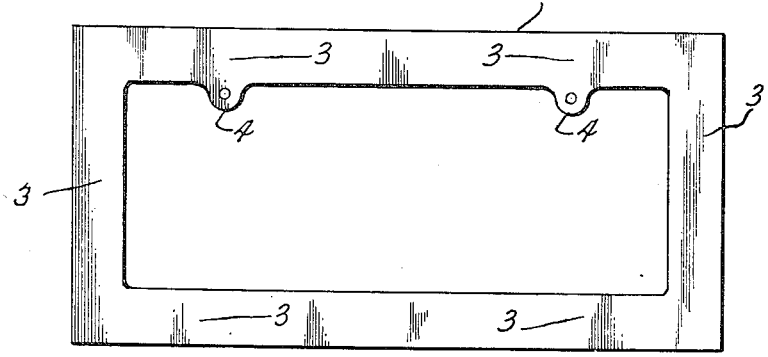
Figures 5, 6:
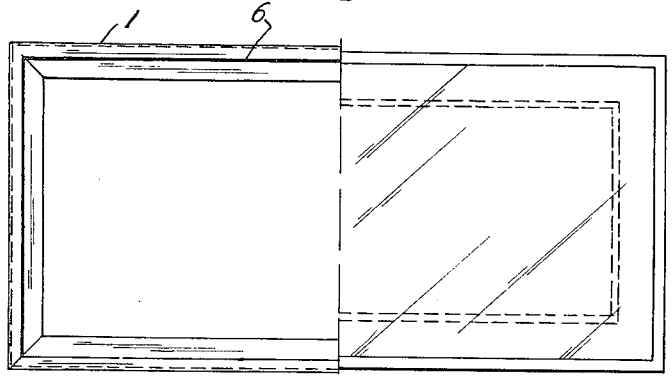
Figure 7:
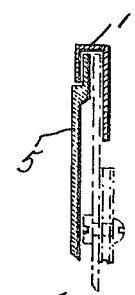

By referring generally to the drawing it will be observed that Fig. 1 is an elevational view of an automobile license number plate in combination with a frame according to the present invention; Fig. 2 is a sectional view on line 2—2 of Fig. 1; Fig. 3 is an elevational view of part of the frame having the red material indicated on part of same; Fig. 4 is an end view of Fig. 3; Fig. 5 is an elevational view of half of the outer frame part in connection with half of the number plate Fig. 6; and Fig. 7 is a sectional view on line 7—7 of Fig. 1.

Similar reference numerals refer to similar parts throughout the several views.

Referring to the drawing in detail it will be seen that the frame comprises an outer member 1 that fits over an inner member 2 on which luminous red tape 3 is attached to cover all except the bolt extensions 4. A sheet of flexible transparent material 5 is placed over the member 2 with the surrounding edge of the transparent material held under the overlapping portion of the outer member 1 as at 6. Glass may be used instead of the flexible transparent material.

From the foregoing it will appear that an ordinary license number plate or tag is provided with a frame assembly enclosing a border member with luminous red tape stuck thereon with a protecting plate or piece of flexible transparent material or glass in the frame and over the member with the luminous red tape thereon.

The various parts may be made of any material suitable for the purpose. Also the parts may be made in different sizes depending on the sizes of the number plates on which to be used.

While I have shown and described the preferred embodiment of my invention, I do not wish to limit same to the exact and precise details of structure, but reserve the right to make all modifications and changes so long as they remain within the scope of the invention and the following claims.

Having described my invention I claim:

1. A frame of the character described for use on a license number plate of an automobile comprising, a metal oblong shaped frame having an overlapping surrounding edge, an inner metal frame having a surrounding flat surface with integral extensions for attaching bolts, luminous red tape attached upon the flat surrounding face of the inner frame, a plate of flexible transparent material over the frame face having the red tape thereon with the edge of the transparent material inserted under the overlapping surrounding edge of the said oblong frame, said frame assembly being adapted for attachment over the face of an automobile license number plate.

2. A frame of the character described for use on a license number plate of an automobile comprising, a metal oblong shaped frame having an overlapping surrounding edge, an inner metal frame having a surrounding flat surface with integral extensions for attaching bolts, luminous red tape attached upon the flat surrounding face of the inner frame, a plate of glass over the frame face having the red tape thereon with the edge of the glass inserted under the overlapping surrounding edge of the said oblong frame, said frame assembly being adapted for attachment over the face of an automobile license number plate.

References Cited in the file of this patent

UNITED STATES PATENTS

| | | |
|---|---|---|
| 1,536,414 | Watts | May 5, 1925 |
| 1,629,060 | Wolfson | May 17, 1927 |
| 2,280,558 | Thompson | Apr. 21, 1942 |
| 2,387,512 | Hillberg | Oct. 23, 1945 |